(No Model.)
S. E. COLLINS.
Water Purifying Apparatus.
No. 240,813. Patented May 3, 1881.
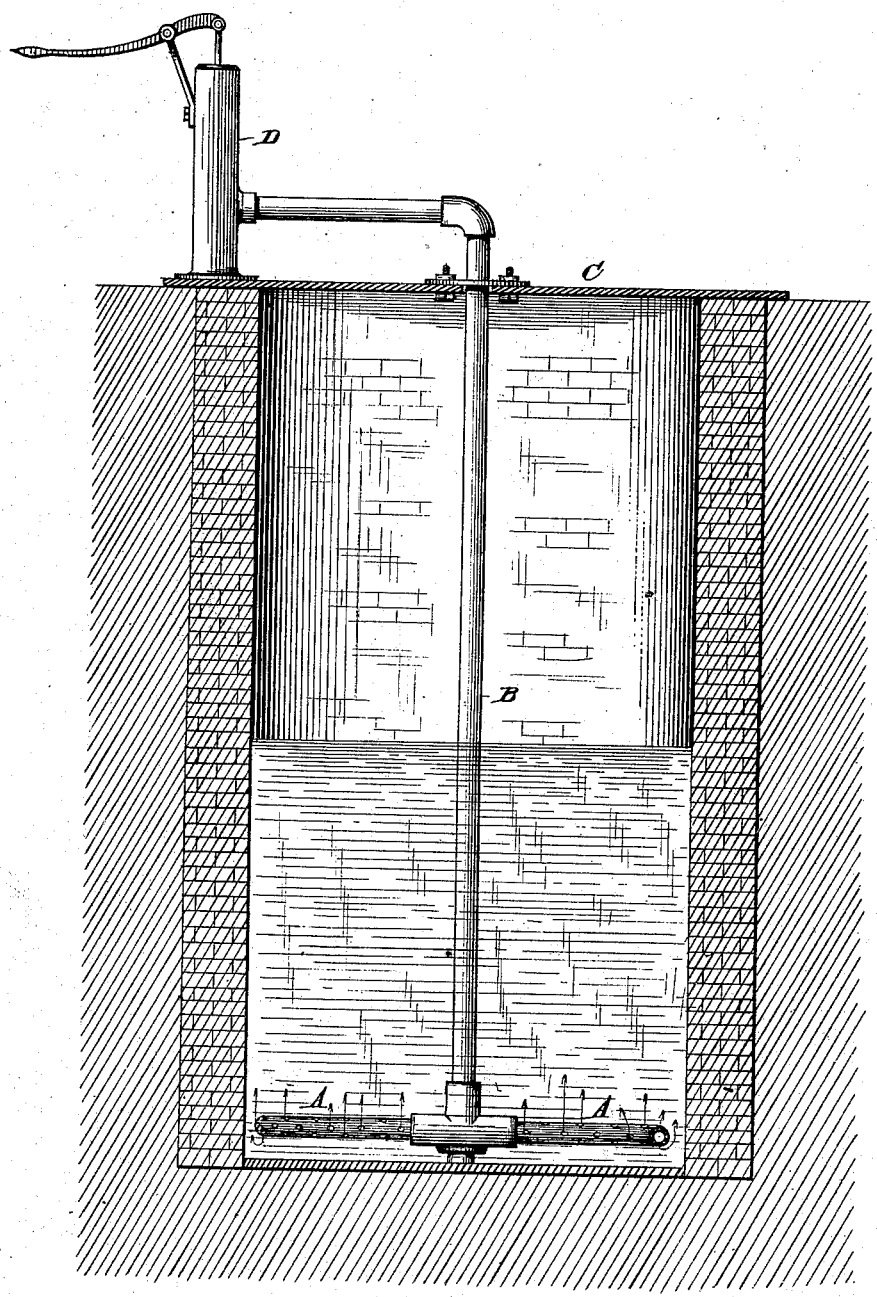

United States Patent Office.

SIDNEY E. COLLINS, OF MARION, SOUTH CAROLINA.

WATER-PURIFYING APPARATUS.

SPECIFICATION forming part of Letters Patent No. 240,813, dated May 3, 1881.

Application filed September 17, 1880. (No model.)

*To all whom it may concern:*

Be it known that I, SIDNEY E. COLLINS, a citizen of the United States, residing at Marion, in the county of Marion and State of South Carolina, have invented certain new and useful Improvements in Apparatus for Purifying Water; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

The present invention has for its object to provide a simple and effective apparatus for purifying water in wells, cisterns, portable vessels, and other receptacles wherever the water has become tainted or impure by reason of the presence of animalculæ, organic matter, or other taint-producing causes.

The invention consists in an apparatus comprising a circular or square air-distributing tube arranged at the bottom of a cistern or well, and combined with a vertical supply-tube connected with an air-forcing pump or apparatus.

In the drawing, the figure represents a cistern having an air-supplying apparatus combined therewith.

The disintegrating action of atmospheric air upon organic substances is well known; and it is also a well-known fact that running water, by reason of its constant exposure to air, is always free from taint. Water contained in cisterns and wells, however, frequently becomes tainted or impure by reason of the presence of animalculæ and organic matters of an animal or vegetable nature. I have found that when water so tainted or rendered impure is subjected to the action of a large amount of atmospheric air all impurities are expelled or consumed, so to say; hence water previously rendered unfit for use by reason of the presence of organic matter is made clear, pure, and palatable.

In carrying out the above-mentioned process in connection with a well, cistern, or reservoir, I make use of a perforated air-distributing tube, A, of a circular or rectangular form, which is arranged at the bottom of the cistern or reservoir, and is connected with a vertical tube, B, extending through the cistern or well-cover C. The tube B is connected with an air-forcing pump, D, arranged in any desired position outside of the well or cistern. Instead of a piston-pump, as shown in the drawing, I may employ a bellows or collapsible rubber air-pump, and generally I prefer to apply the air-supply tube in such manner that the air is taken at a point some distance above the earth where it is the purest.

It will be apparent that the air-pump, when in motion, will be constantly discharging air through the water from the bottom to the top, thus agitating the water thoroughly and forcing into it a large amount or surplus of oxygen. This will cause the destruction of all organic matters and impurities in the foulest well or cistern. I have found particularly that the water-bugs, water-lice, and "wriggles," which generally infest cisterns, are destroyed in a short time by aerating or oxidizing the water in the manner proposed by me.

Having thus described my invention, what I claim as new, and desire to secure by Letters Patent, is—

The combination of the horizontal perforated distributing-tube A, vertical supply-tube B, and air-forcing apparatus D, with a well or cistern, as and for the object stated.

In testimony whereof I affix my signature in presence of two witnesses.

SIDNEY EQUAL COLLINS.

Witnesses:
J. H. SMITH,
P. Y. BETHEA.